(12) United States Patent
Wang et al.

(10) Patent No.: US 9,816,686 B2
(45) Date of Patent: Nov. 14, 2017

(54) LENS WITH REDUCED THICKNESS AND OPTICAL UNIT HAVING THE SAME

(71) Applicant: LITE-ON TECHNOLOGY CORP., Taipei (TW)

(72) Inventors: Shih-Chang Wang, Taipei (TW); Wei-Wen Shih, Taipei (TW); Pin-Hao Hsu, Taipei (TW); Yao-Chi Peng, Taipei (TW)

(73) Assignee: Lite-On Technology Corp., Taipei (TW)

( * ) Notice: Subject to any disclaimer, the term of this patent is extended or adjusted under 35 U.S.C. 154(b) by 64 days.

(21) Appl. No.: 15/160,107

(22) Filed: May 20, 2016

(65) Prior Publication Data
US 2017/0254510 A1 Sep. 7, 2017

(30) Foreign Application Priority Data
Mar. 4, 2016 (CN) .......................... 2016 1 0124508

(51) Int. Cl.
| | |
|---|---|
| F21V 7/00 | (2006.01) |
| F21V 13/04 | (2006.01) |
| F21V 5/04 | (2006.01) |
| F21S 8/08 | (2006.01) |
| F21W 131/103 | (2006.01) |
| F21Y 101/02 | (2006.01) |

(52) U.S. Cl.
CPC .............. *F21V 13/04* (2013.01); *F21S 8/085* (2013.01); *F21V 5/04* (2013.01); *F21V 7/00* (2013.01); *F21W 2131/103* (2013.01); *F21Y 2101/02* (2013.01)

(58) Field of Classification Search
CPC .... F21S 8/05; F21V 13/04; F21V 5/04; F21V 7/00; F21W 2101/00; F21Y 2101/02
See application file for complete search history.

(56) References Cited

U.S. PATENT DOCUMENTS

| | | | | |
|---|---|---|---|---|
| 6,997,571 | B2* | 2/2006 | Tenmyo | G03B 15/05 362/16 |
| 8,292,466 | B2* | 10/2012 | Huang | F21V 5/04 362/308 |
| 8,749,137 | B2* | 6/2014 | Lee | F21V 5/045 313/110 |
| 2008/0192484 | A1* | 8/2008 | Lee | F21V 5/04 362/327 |
| 2014/0168994 | A1* | 6/2014 | Wang He | F21V 5/04 362/311.02 |

* cited by examiner

Primary Examiner — Ali Alavi
(74) Attorney, Agent, or Firm — Rosenberg, Klein & Lee

(57) ABSTRACT

A lens, which is adapted to control distribution of light emitted by a light source, includes a curved light-projecting surface distal from the light source, and a light-incident surface opposite to the light-projecting surface. The light-incident surface includes a plurality of curved sections facing the light source, and a plurality of connecting sections. Each of the connecting sections interconnects two adjacent ones of the curved sections, and has opposite first and second connection sides that are respectively connected to the two adjacent ones of the curved sections. A distance between the first connection side and the light source is not equal to a distance between the second connection side and the light source.

13 Claims, 26 Drawing Sheets

LENS WITH REDUCED THICKNESS AND OPTICAL UNIT HAVING THE SAME

CROSS-REFERENCE TO RELATED APPLICATION

This application claims priority of Chinese Patent Application No. 201610124508.1, filed on Mar. 4, 2016.

FIELD

The disclosure relates to a lens, more particularly to a lens with reduced thickness for use in outdoor lighting. This disclosure also relates to an optical unit including the lens.

BACKGROUND

Light-emitting diodes are energy efficient, have a long service life, and have been used extensively for outdoor lighting. Since light emitted by a conventional light-emitting diode is relatively focused, a secondary light distribution technique, e.g., use of a secondary optical lens, can be employed to provide a more uniform light distribution for applications in roadway illumination. The light emitted by the conventional light-emitting diode is refracted upon entering the secondary optical lens, therefore, design parameters such as curvature and thickness of the secondary optical lens may be manipulated for achieving a more uniform light distribution or for forming a desirable light distribution pattern.

SUMMARY

Therefore, an object of the disclosure is to provide a lens that serves as a secondary optical lens having a reduced thickness.

According to one aspect of the disclosure, the lens is adapted to control distribution of light emitted by a light source. The lens includes a main body. The main body includes a curved light-projecting surface that is distal from the light source, and a light-incident surface that is opposite to the light-projecting surface, and that is proximate to the light source. The light-incident surface includes a plurality of curved sections facing the light source, and a plurality of connecting sections. Each of the connecting sections interconnects two adjacent ones of the curved sections, and has opposite first and second connection sides that are respectively connected to the two adjacent ones of the curved sections. A distance between the first connection side and the light source is not equal to a distance between the second connection side and the light source.

Another object of the disclosure is to provide an optical unit including the lens with reduced thickness.

According to another aspect of the disclosure, the optical unit includes the lens, the light source, and a housing.

The housing defines an accommodating space. The light source is disposed in the accommodating space.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
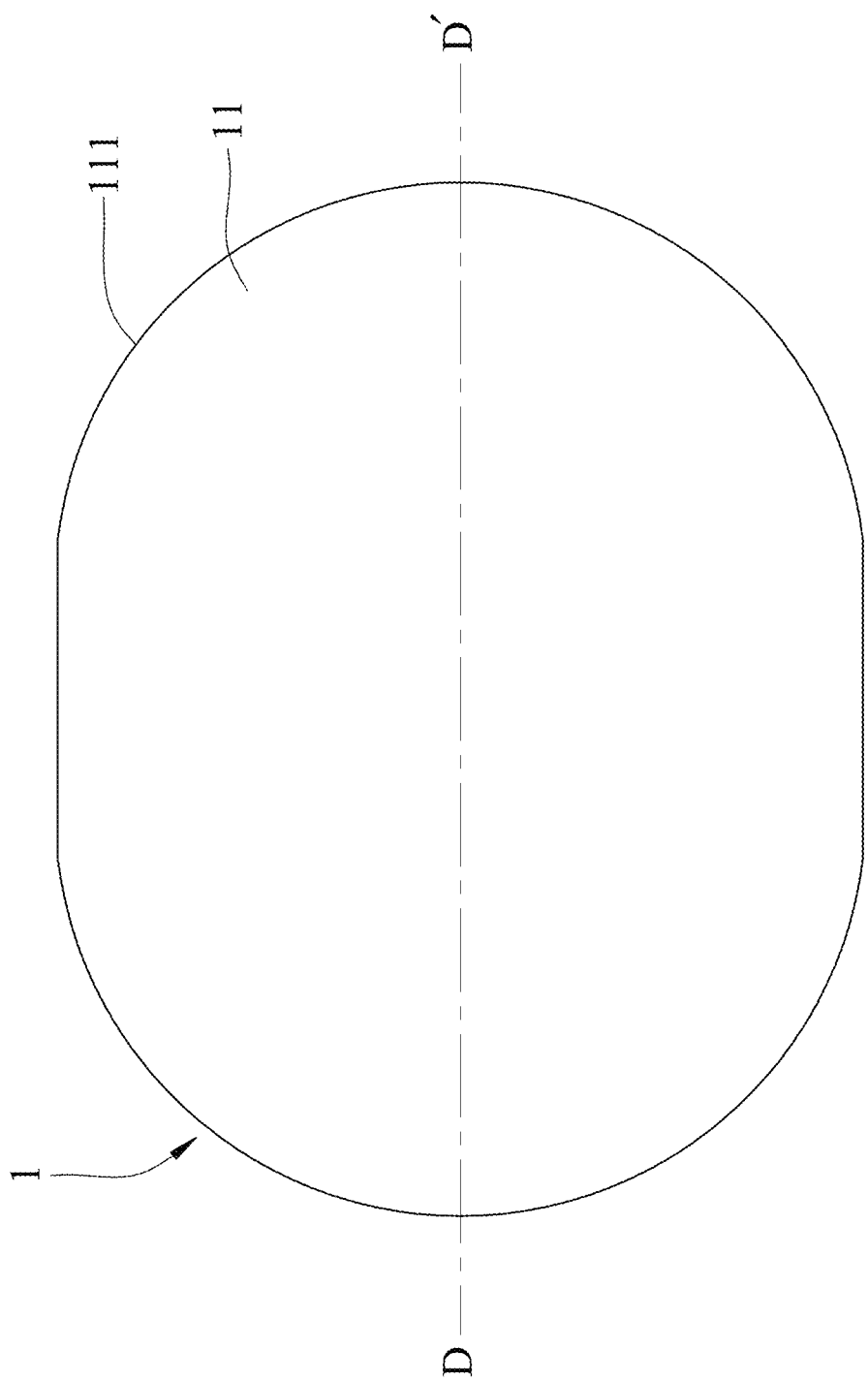
FIG. 1 is a schematic top view of a first embodiment of a lens according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
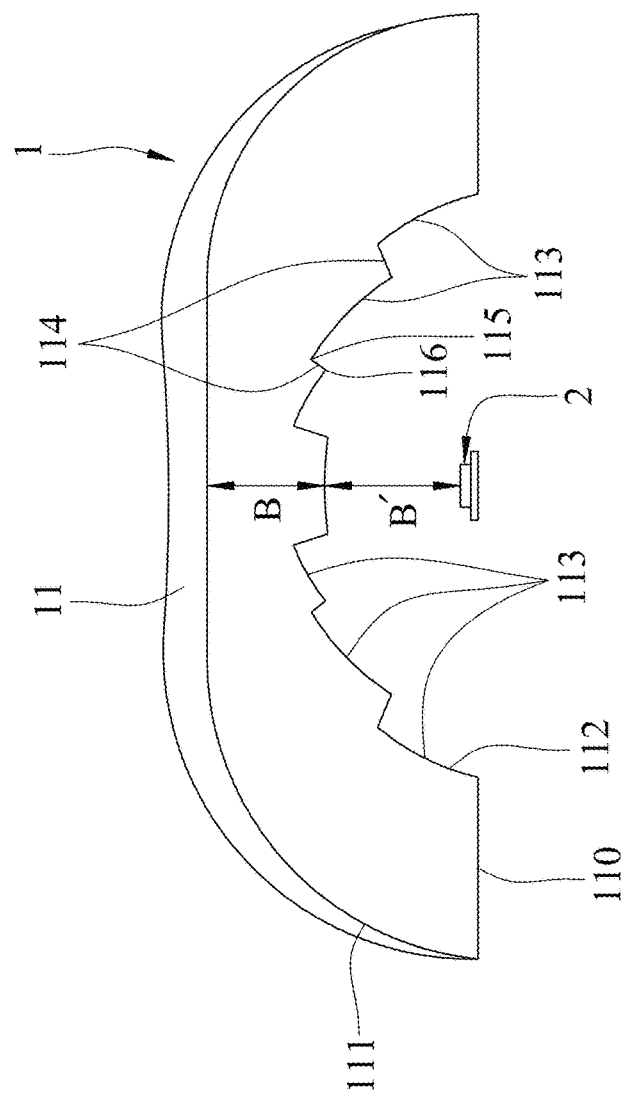
FIG. 2 is a schematic sectional view taken along line D-D' in FIG. 1, illustrating the lens of the first embodiment and a light source.

Referring to FIGS. 1 and 2, a first embodiment of a lens 1 according to the disclosure is adapted to control distribution of light emitted by a light source 2. The lens 1 includes a main body 11. The main body 11 includes a curved light-projecting surface 111 that is distal from the light source 2, and a light-incident surface 112 that is opposite to the light-projecting surface 111, and that is proximate to the light source 2. The light-incident surface 112 includes a plurality of curved sections 113 facing the light source 2, and a plurality of connecting sections 114. Each of the connecting sections 114 interconnects two adjacent ones of the curved sections 113, and has opposite first and second connection sides 115, 116 (see FIG. 2) that are respectively connected to the two adjacent ones of the curved sections 113. A distance between the first connection side 115 and the light source 2 is not equal to a distance between the second connection side 116 and the light source 2.

In this embodiment, the light-projecting surface 111 is convex in shape. Each of the curved sections 113 of the light-incident surface 112 is concave toward the light-projecting surface 111. The curved sections 113 increase in area toward a bottom periphery 110 of the main body 11 of the lens 1, and increase in inclination toward the bottom periphery 110. In certain embodiments, the shape of the light-projecting surface 111 may be altered based on practical requirements. Similarly, the shape of the curved sections 113 is not limited to being concave toward the light-projecting surface 111, and may be changed according to different design needs.

In this embodiment, the light-incident surface 112 includes seven of the curved sections 113. In certain embodiments, the number of the curved sections 113 is not limited to seven, and may be altered according to the size and shape of the main body 11 of the lens 1, or for formation of a desirable light distribution pattern.

In this embodiment, a distance between the light-projecting surface 111 and a center of each of the curved sections 113 is defined as a first distance, and a distance between the center of each of the curved sections 113 and the light source 2 is defined as a second distance. The ratio of the second distance to the first distance is greater than or equal to 1.

To be more specific, as illustrated in FIG. 2, the distance between the light-projecting surface 111 and the center of each of the curved sections 113 is defined as the first distance (B), and the distance between the center of each of the curved sections 113 and the light source 2 is defined as the second distance (B'). The ratio of the second distance (B') to the first distance (B) is greater than and closed to 1.

In this embodiment, the lens 1 is integrally formed. Therefore, the ratio of the second distance (B') to the first distance (B) being less than 1 would lead to an increase in manufacturing time for making a mold for the lens 1, and would result in an increase in defect rates since the lens 1 is easily deformed during manufacture.

Figure 3:
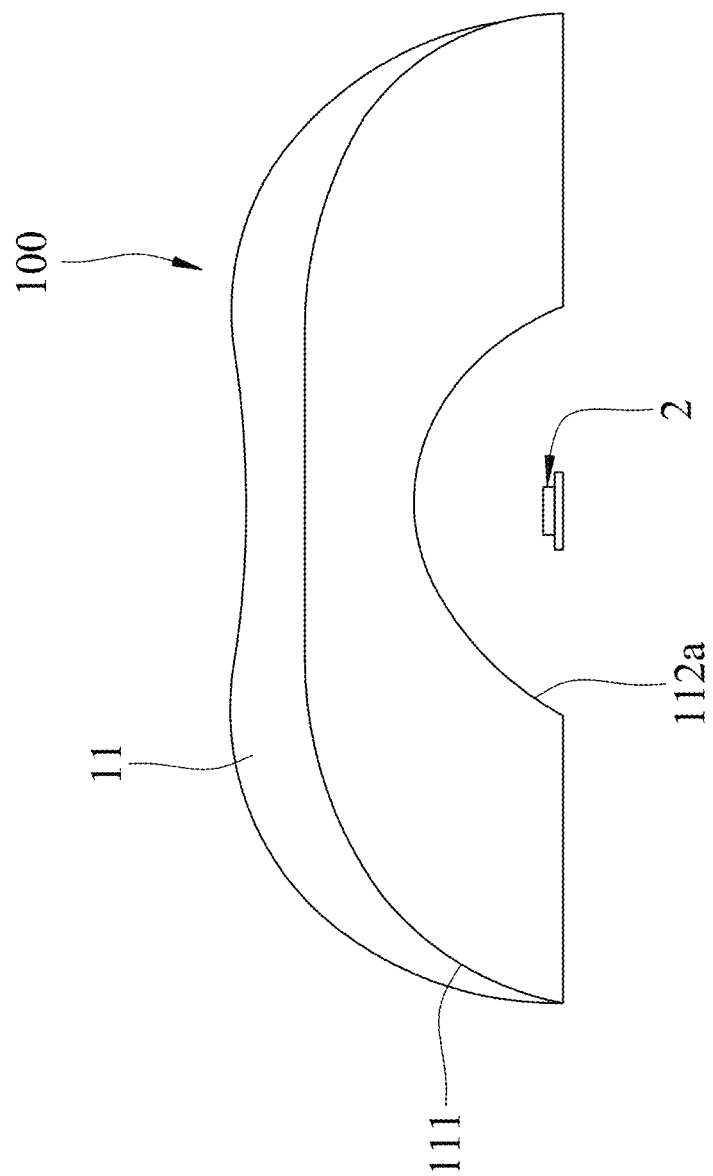
FIG. 3 is a schematic sectional view illustrating a lens of a first comparative example and the light source.

FIG. 3 illustrates the light source 2 and a lens 100 of a first comparative example. The lens 100 of the first comparative example is similar to the lens 1 of this embodiment except that the lens 100 includes a light-incident surface 112a having a smooth curved shape.

Figure 4A:
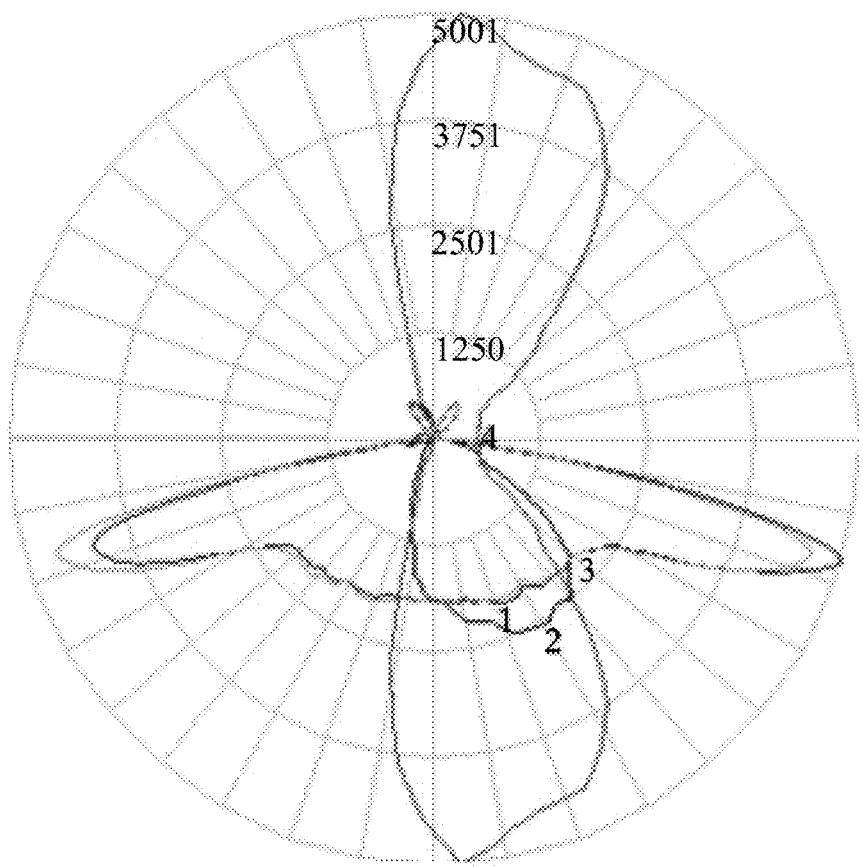
FIG. 4A is a polar luminous intensity graph generated using the lens of the first comparative example.
Figure 4B:
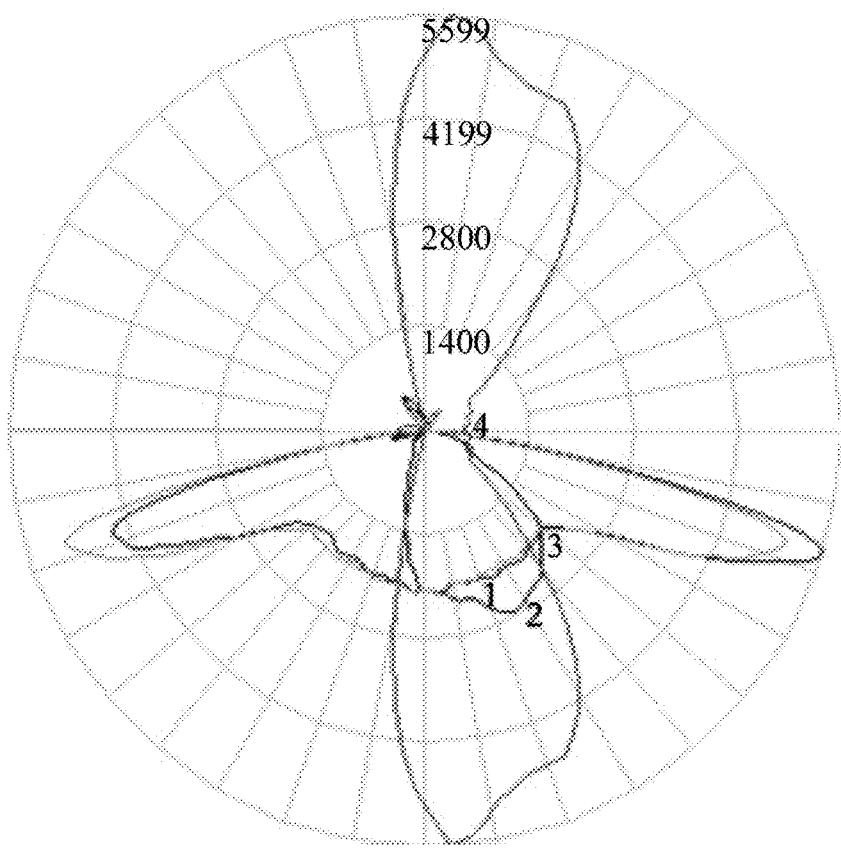
FIG. 4B is a polar luminous intensity graph generated using the lens of the first embodiment.
Figure 5A:
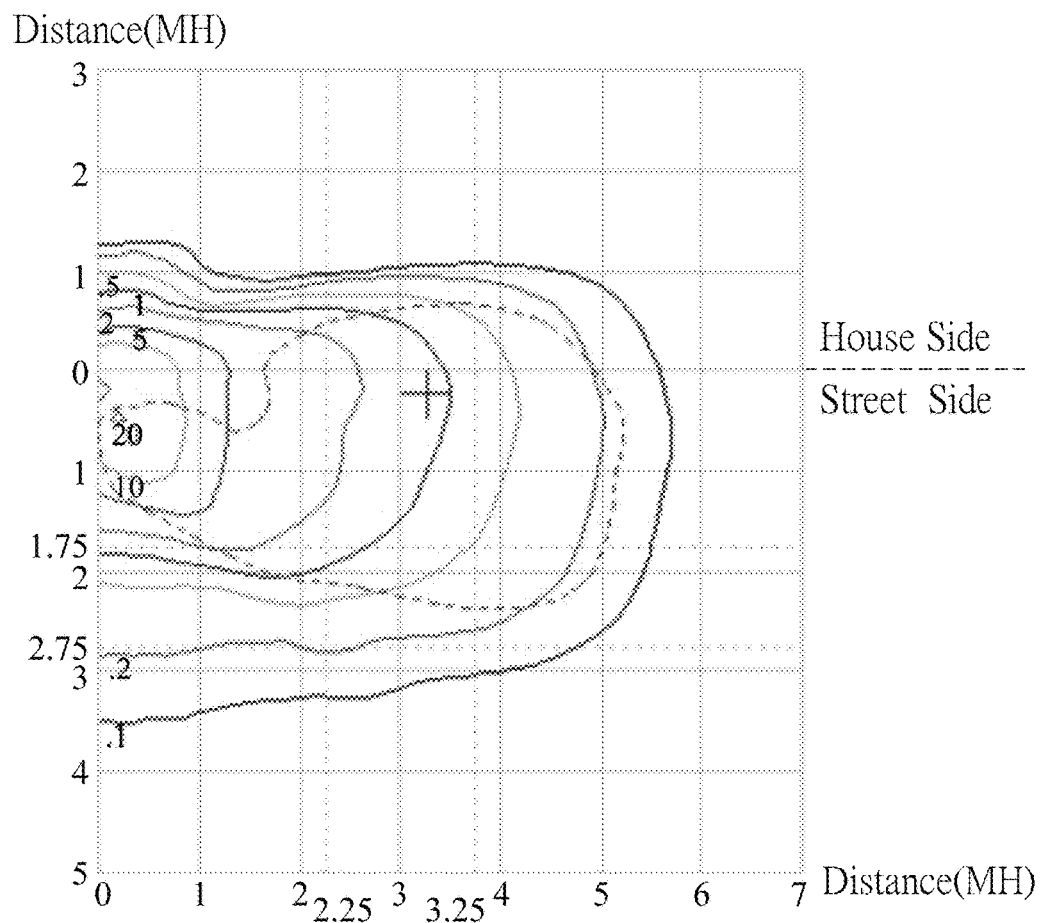
FIG. 5A is an IES mounting height plot generated using the lens of the first comparative example, simulating roadway illumination.
Figure 5B:
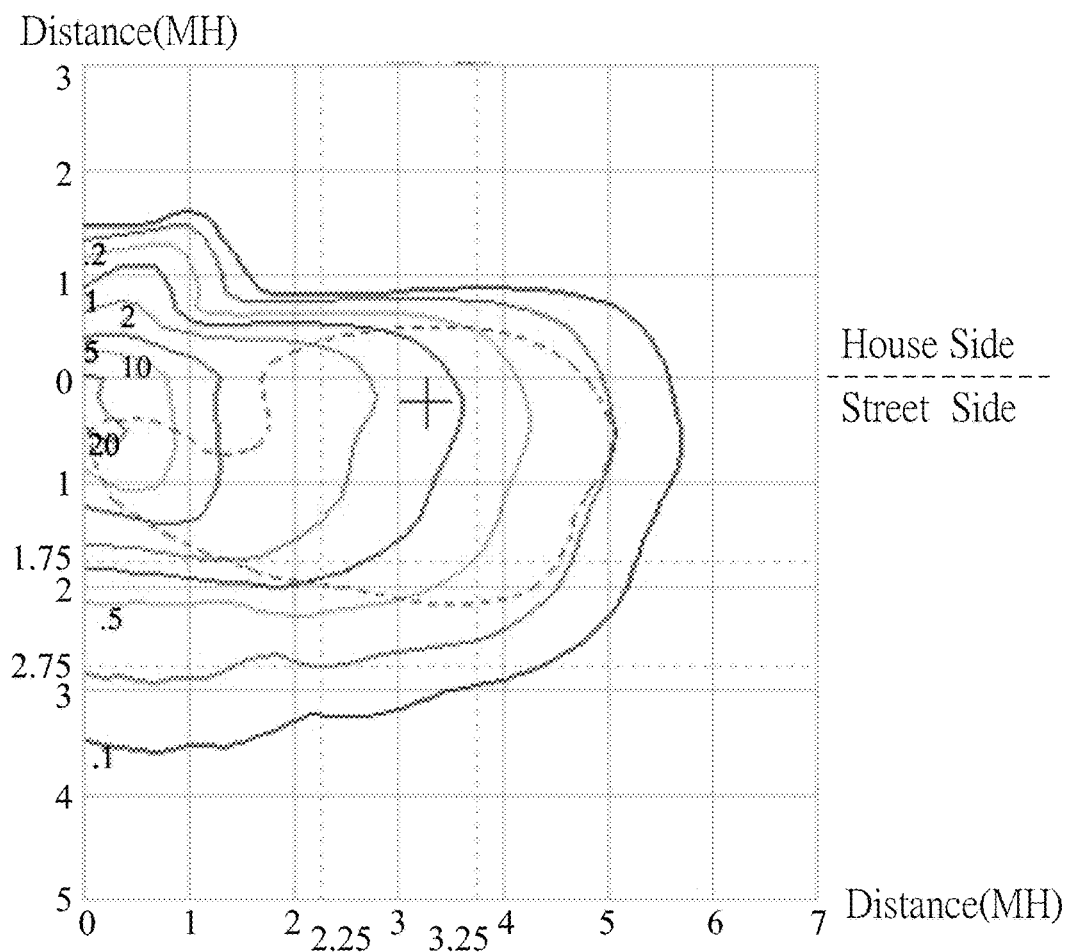
FIG. 5B is an IES mounting height plot generated using the lens of the first embodiment, simulating roadway illumination.
Figure 6:
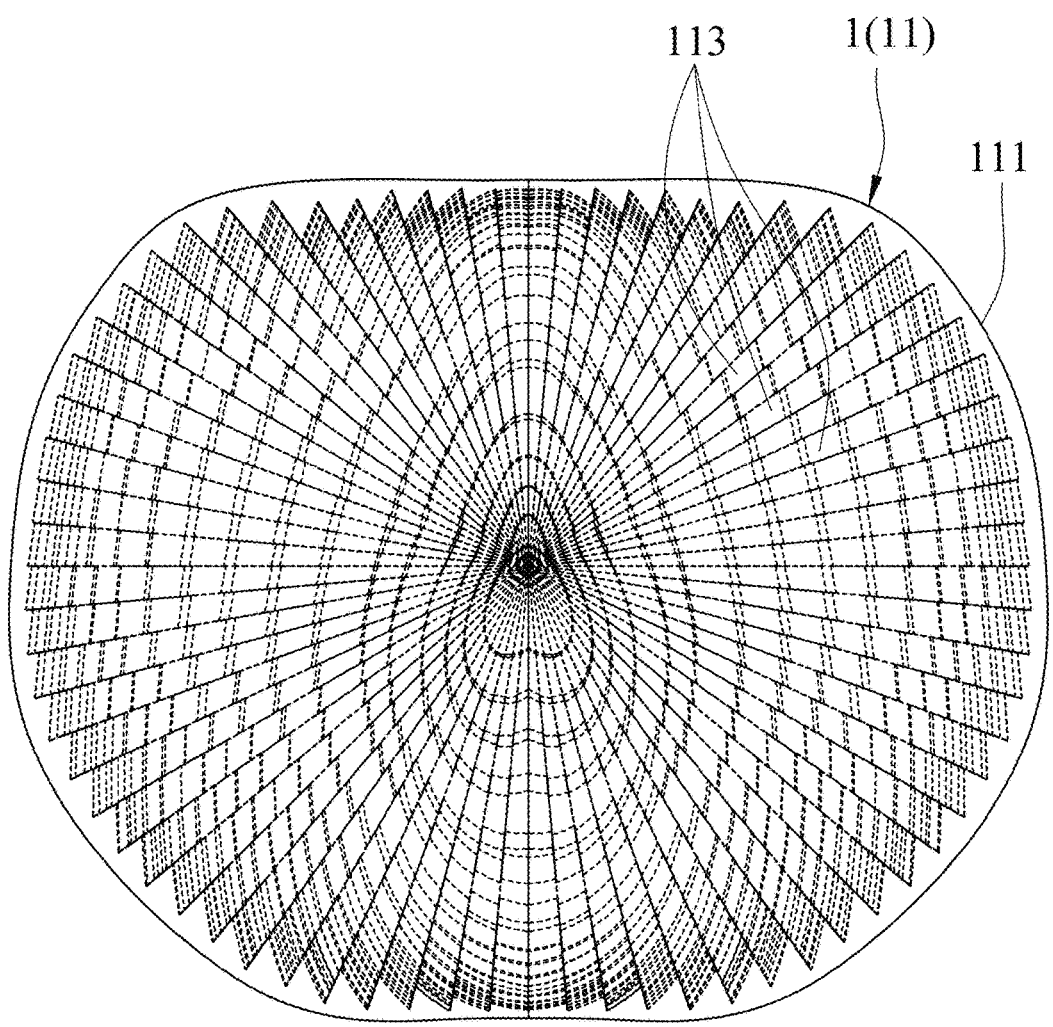
FIG. 6 is a schematic bottom view of a second embodiment of the lens according to the disclosure.
Figure 7:
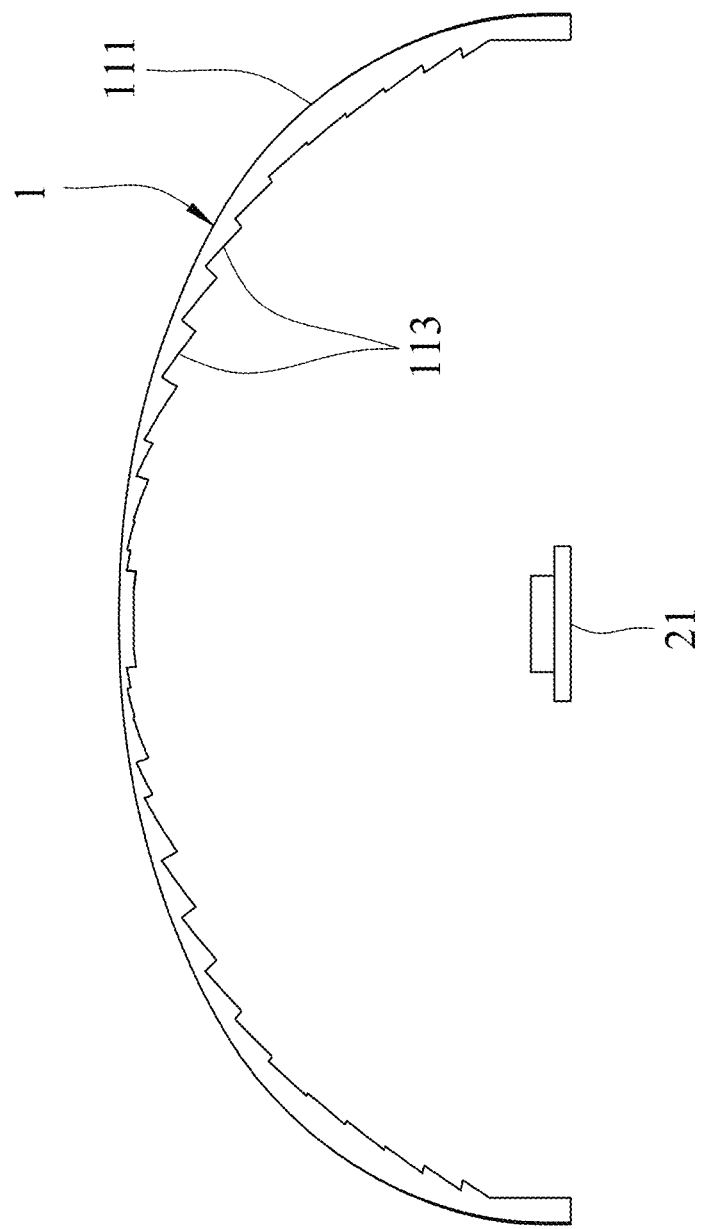
FIG. 7 is a schematic sectional view illustrating relative positions of the lens of the second embodiment and the light source.
Figure 8:
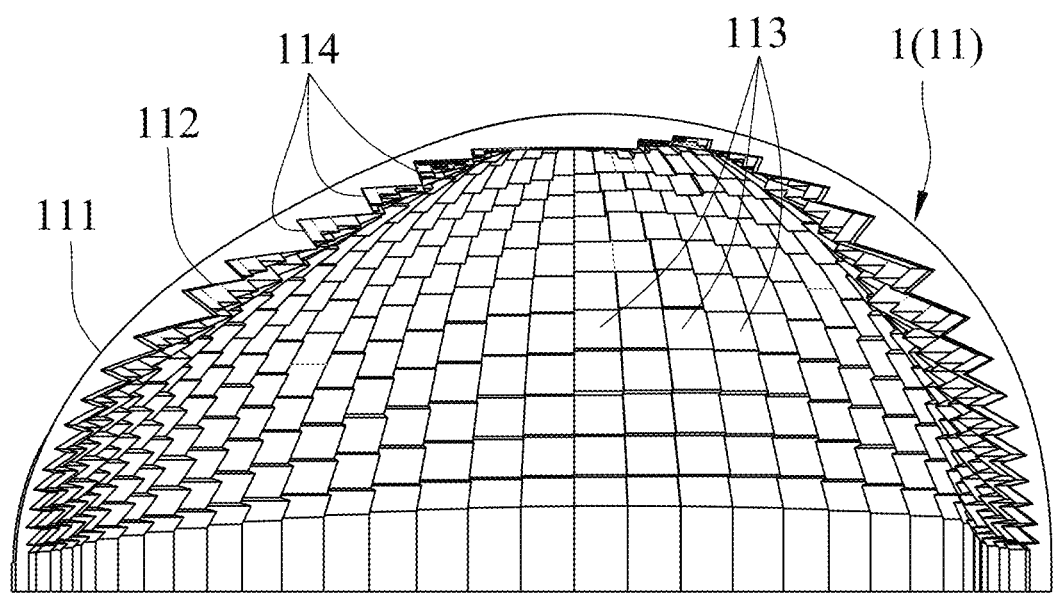
FIG. 8 is a schematic side view of the lens of the second embodiment.
Figure 9:
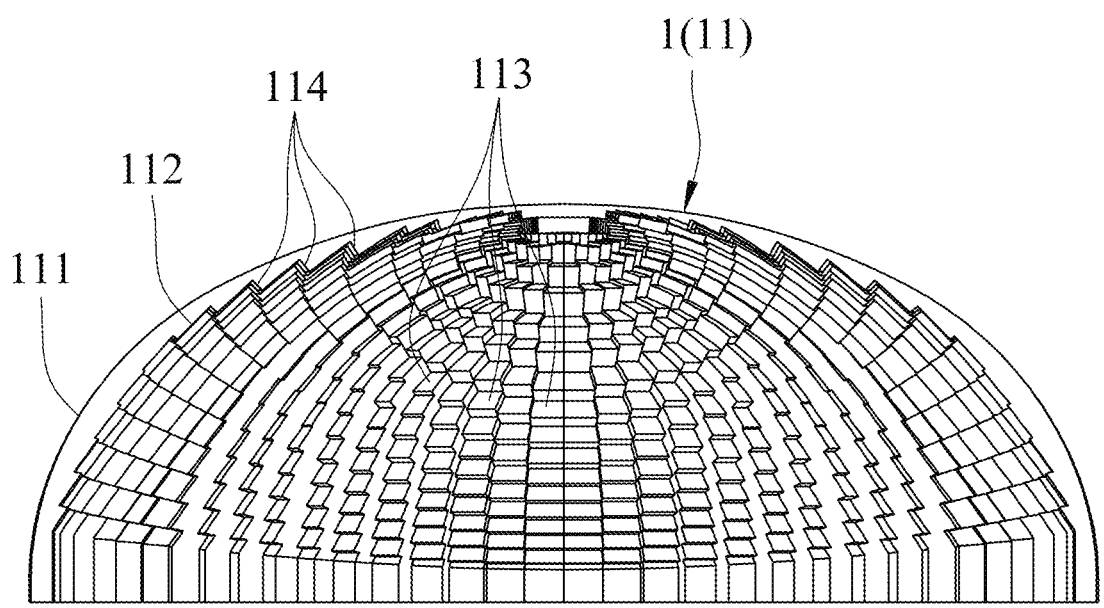
FIG. 9 is a view similar to FIG. 8, but illustrating the lens of the second embodiment viewed from another angle.

FIG. 4A and FIG. 4B are polar luminous intensity graphs generated using the lens 100 of the first comparative example and using the lens 1 of this embodiment, respectively. FIG. 5A and FIG. 5B are IES mounting height plots generated using the lens 100 of the first comparative example and using the lens 1 of this embodiment, respectively. In comparison, the lens 1 of this embodiment has a light distribution pattern and an intensity distribution similar to those of the lens 100, but has a thickness smaller than that of the lens 100, thereby reducing the weight of the lens 1, and reducing the amount of raw material used for making the lens 1. Furthermore, the space available for use in the lens 1 is increased.

Referring to FIGS. 6 to 9, a second embodiment of the lens 1 according to the disclosure has a structure similar to that of the first embodiment, and the difference between the first and second embodiments resides in that each of the curved sections 113 of the second embodiment has a plurality of edges. In the second embodiment, each of the curved sections 113 has four edges. The light-incident surface 112 includes eleven hundred and fifty two of the curved sections 113. The light source used with the lens 1 of the second embodiment is an array of light-emitting diodes 21. In certain embodiments, the number of the edges of each of the curved sections 113 is not limited to four and may be three, six, etc., depending on practical requirements.

FIGS. 10A to 10D, FIGS. 11A to 11D, and FIGS. 12A to 12D are simulation results using Light Tools software (Synopsys, Inc.) simulating roadway illumination. According to the ANSI/IESNA (American National Standard Institute/Illuminating Engineering Society of North America) RP-8-14 roadway lighting standard, longitudinal light distribution is classified as short, medium, and long. Short is defined as maximum intensity pointing to a point located between 1.0 to 2.25 mounting heights. Medium is defined as maximum intensity pointing to a point located between 2.25 to 3.75 mounting heights. Long is defined as maximum intensity pointing to a point located between 3.75 to 6.0 mounting heights.

Figure 10A:
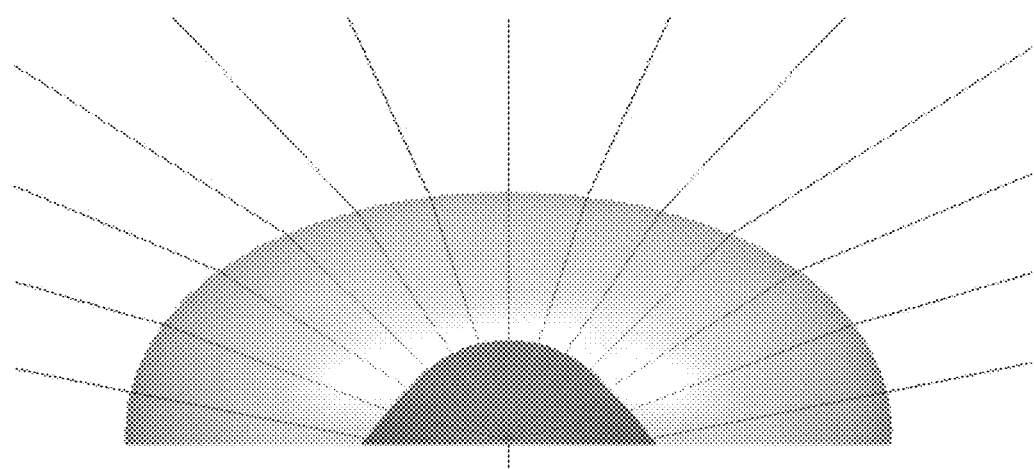
FIG. 10A is a light distribution graph generated using a lens of a second comparative example, with the lines illustrating the light paths.
Figure 10B:
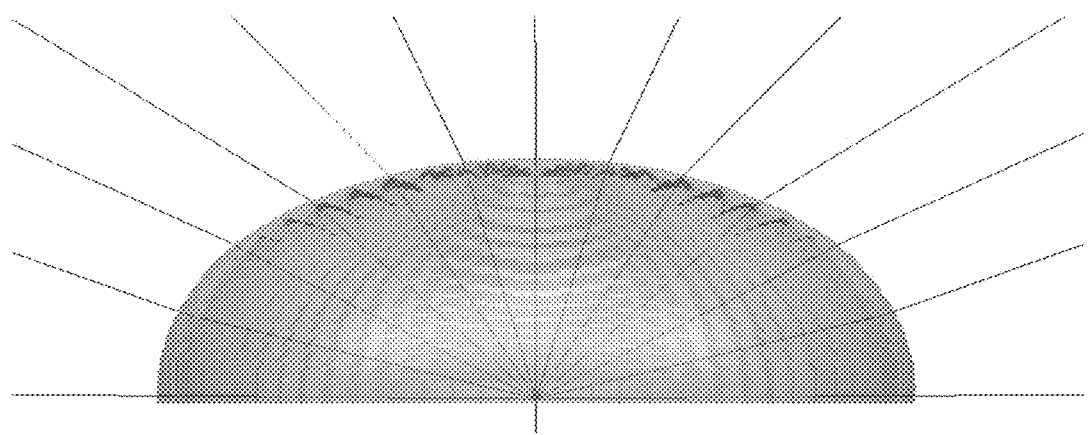
FIGS. 10B, 10C, and 10D are light distribution graphs generated using the lens of the second embodiment, simulating the short, medium, and long longitudinal classifications for roadway illumination, respectively.
Figure 10C:
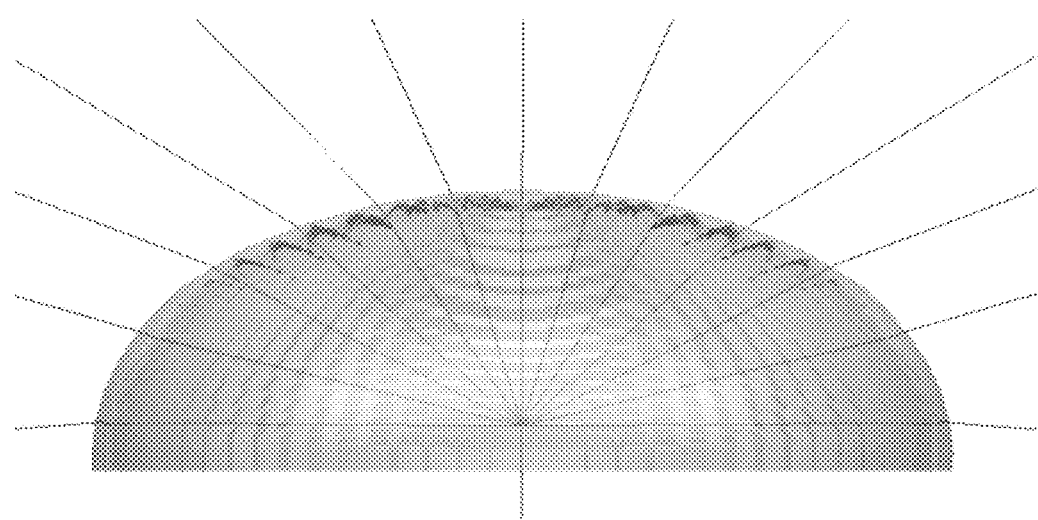
Figure 10D:
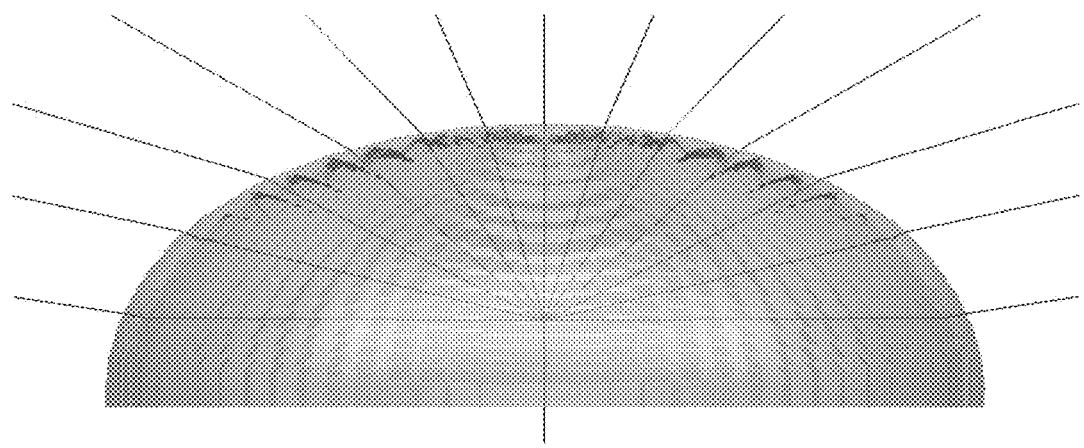
Figure 11A:
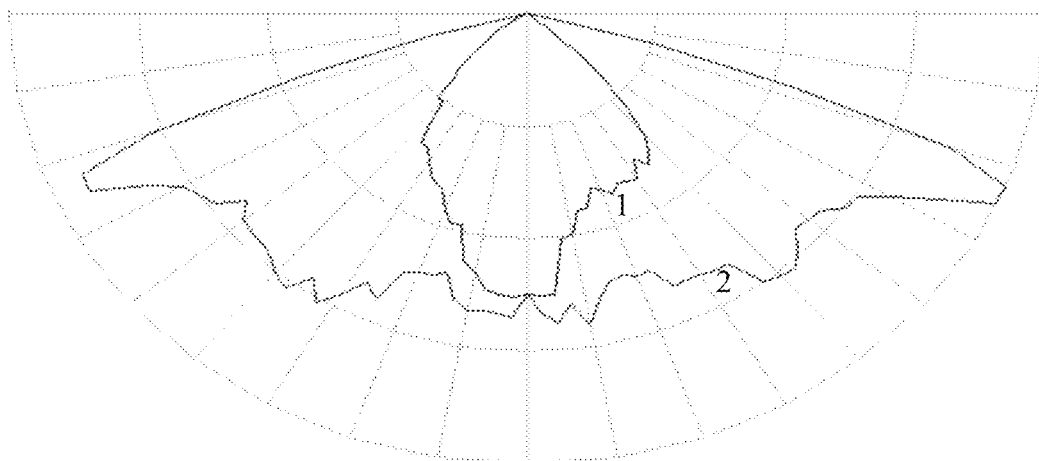
FIG. 11A is a polar luminous intensity graph generated using the lens of the second comparative example, simulating roadway illumination.
Figure 11B:
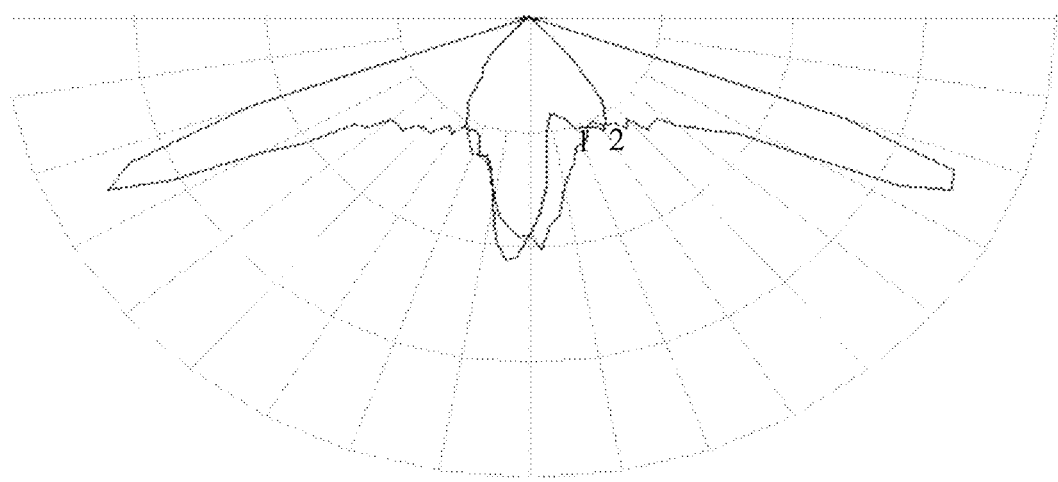
FIGS. 11B, 11C, and 11D are polar luminous intensity graphs generated using the lens of the second embodiment, simulating the short, medium, and long longitudinal classifications for roadway illumination, respectively.
Figure 11C:
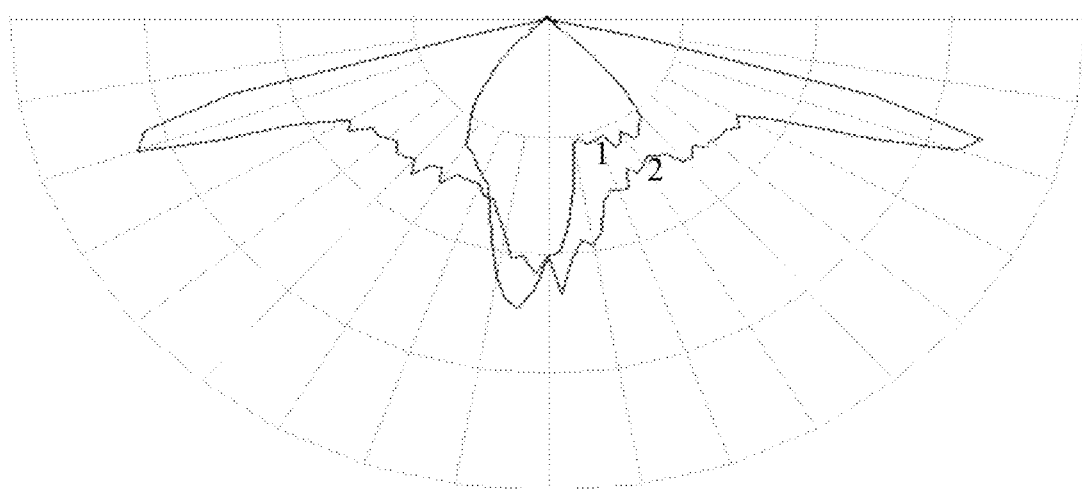
Figure 11D:
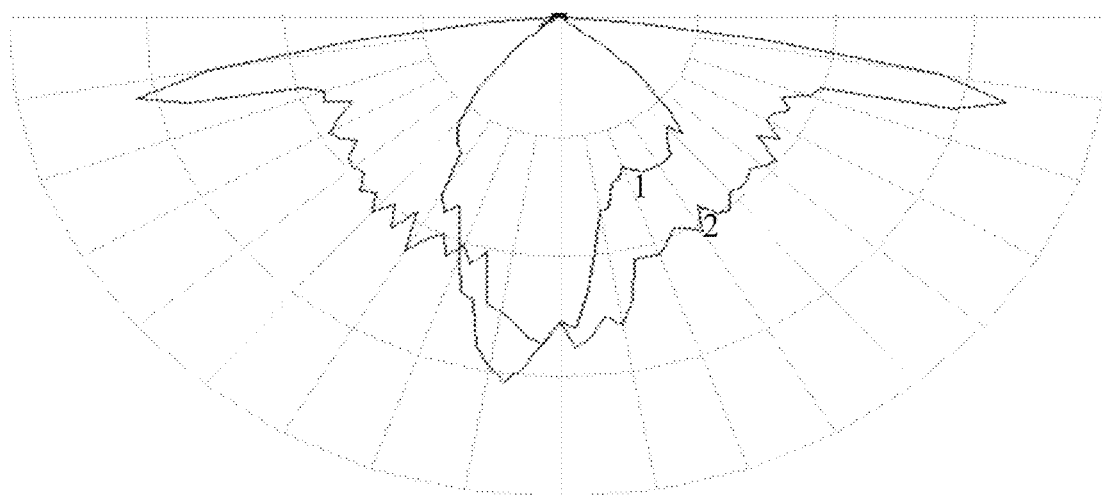

FIG. 10A is a light distribution graph generated using a lens of the second comparative example (not shown) that has a size equal to that of the lens 1 of the second embodiment, and that has a smooth curved light-incident surface similar to that of the first comparative example. FIG. 10B to FIG. 10D are light distribution graphs generated using the lens 1 of the second embodiment, simulating the short, medium, and long classifications, respectively. FIG. 11A is a polar luminous intensity graph generated using the lens of the second comparative example. FIG. 11B to FIG. 11D are polar luminous intensity graphs generated using the lens 1 of the second embodiment, simulating the short, medium, and long classifications, respectively.

Figure 12A:
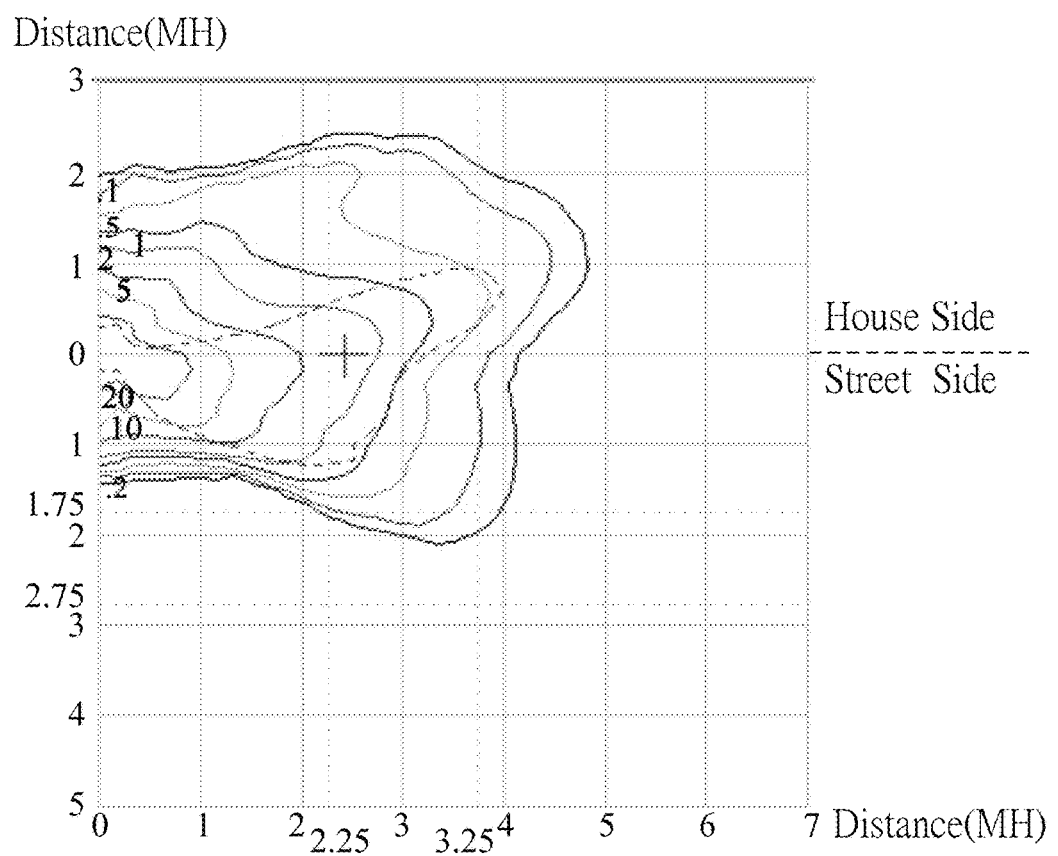
FIG. 12A is an IES mounting height plot generated using the lens of the second comparative example, simulating roadway illumination.
Figure 12B:
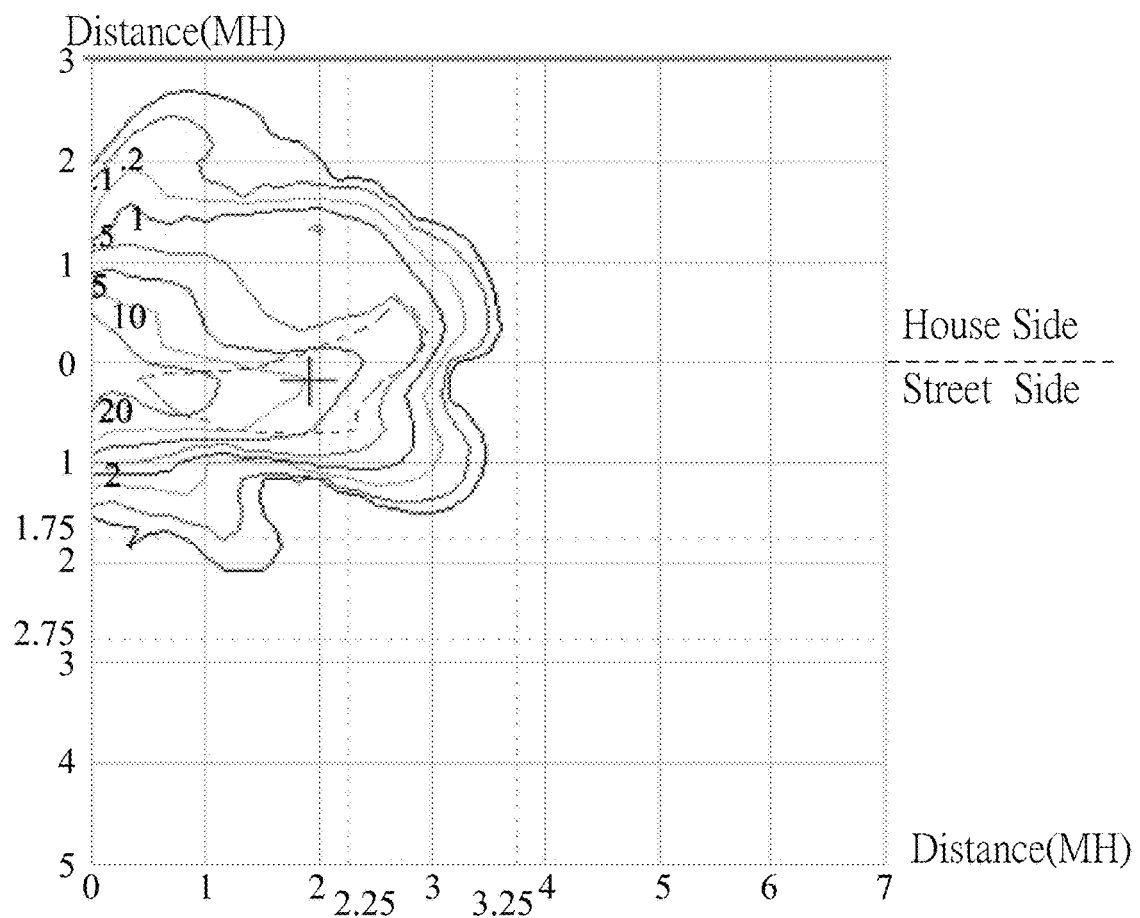
FIGS. 12B, 12C, and 12D are IES mounting height plots generated using the lens of the second embodiment, simulating the short, medium, and long longitudinal classifications for roadway illumination, respectively.
Figure 12C:
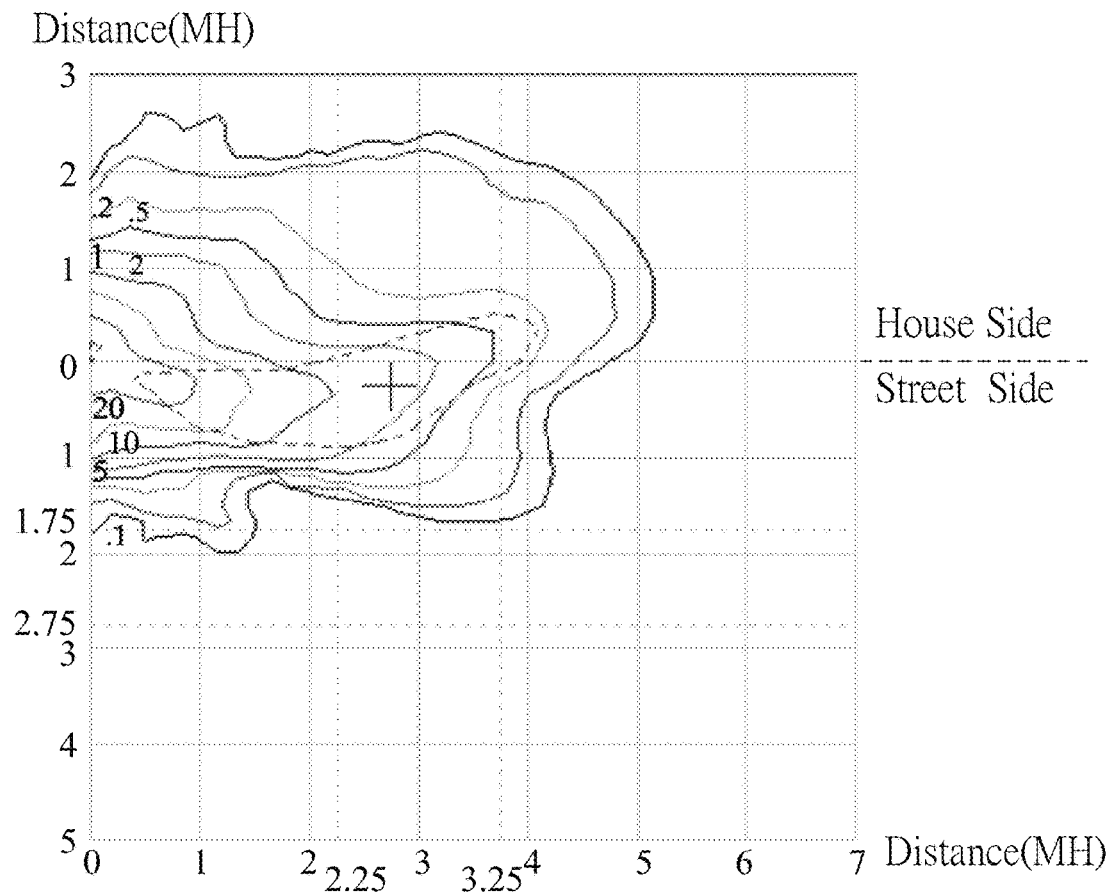
Figure 12D:
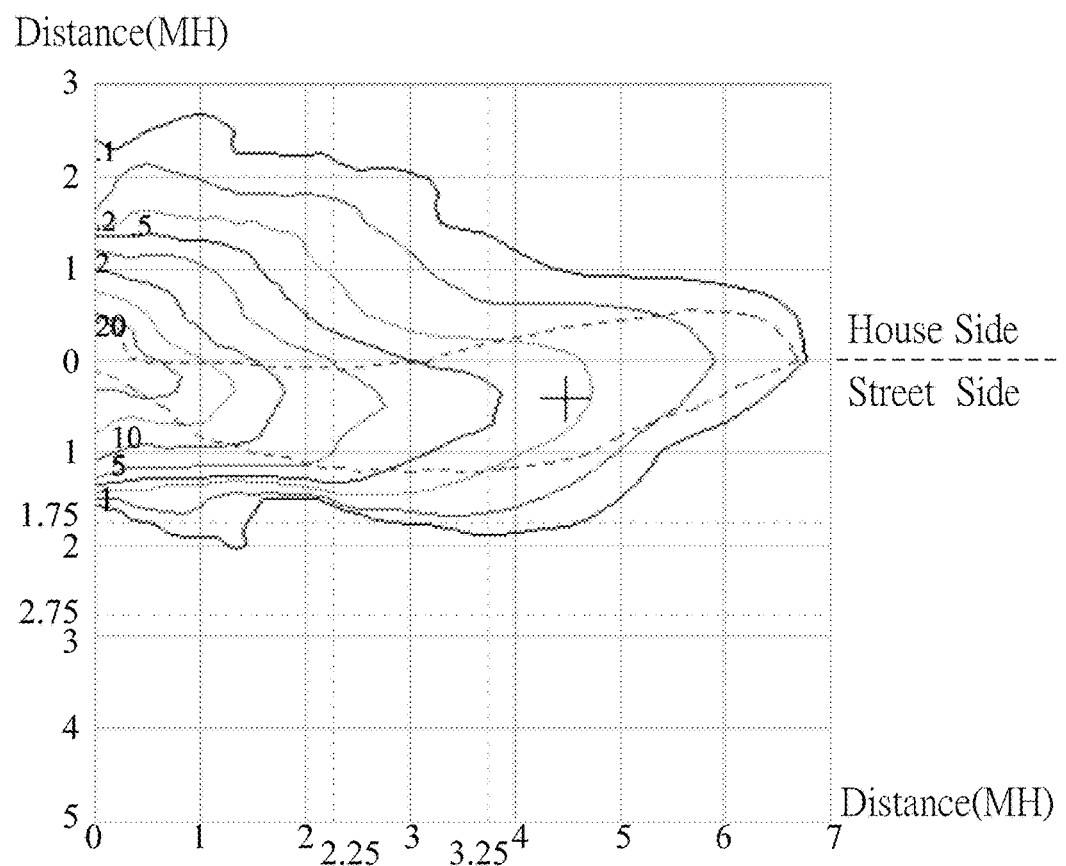

FIG. 12A is an IES mounting height plot generated using the lens of the second comparative example based on a mounting height of 10 feet. FIG. 12B to FIG. 12D are IES mounting height plots generated using the lens 1 of the second embodiment based on a mounting height of 10 feet, simulating the short, medium, and long classifications, respectively.

The simulation results, as illustrated in FIGS. 10A to 10D, FIGS. 11A to 11D, and FIGS. 12A to 12D, show that the lens 1 of the second embodiment is capable of forming different light distribution patterns that satisfy the criteria for the short, medium, and long classifications. It is worth mentioning that the curvature of the curved sections 113 may be altered for meeting the specifications for different IES street lamp types (e.g., Type I, Type II, Type III, etc.).

Figure 13:
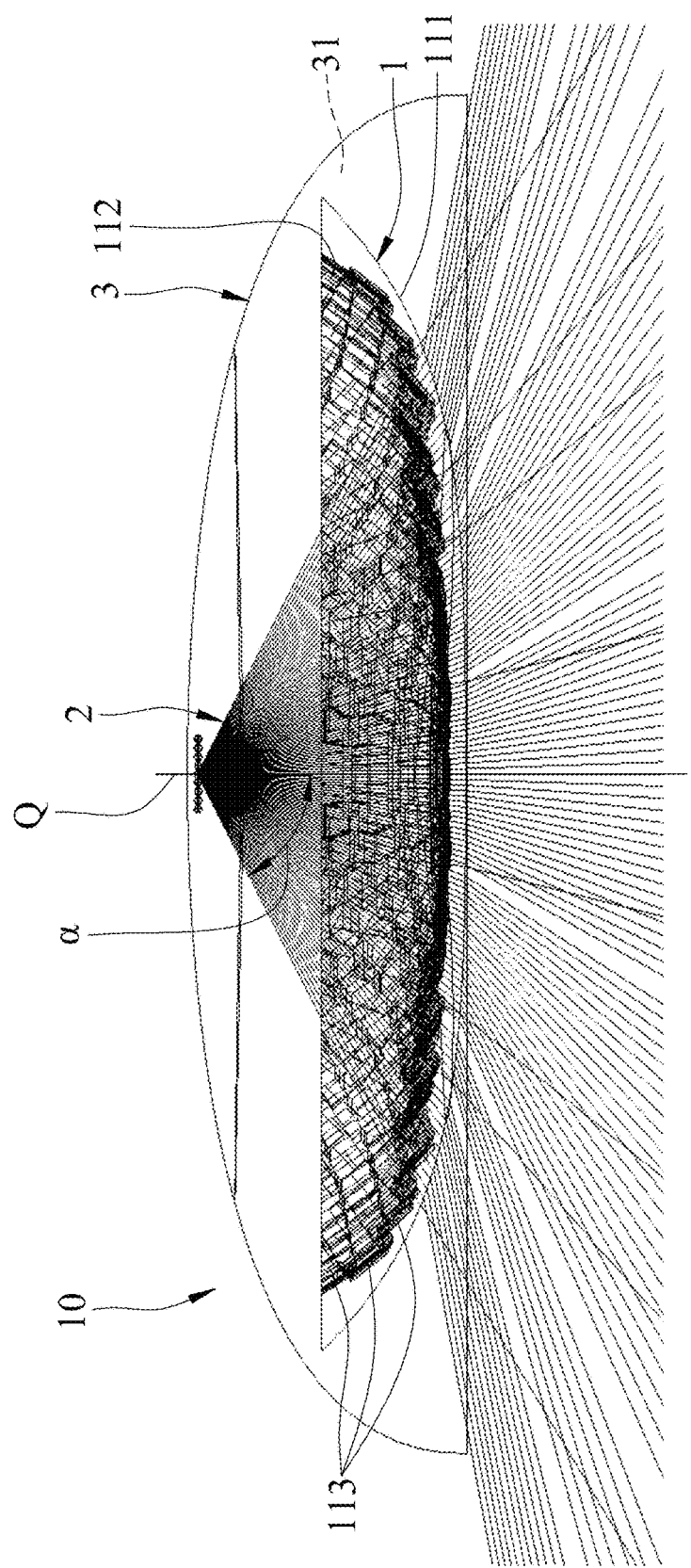
FIG. 13 is a schematic side view of a first embodiment of an optical unit according to the disclosure.

FIG. 13 illustrates a first embodiment of an optical unit 10 according to the disclosure. The optical unit 10 includes a housing 3, the light source 2, and the lens 1.

The housing 3 defines an accommodating space 31. The light source 2 is disposed in the accommodating space 31. The lens 1 is disposed in the accommodating space 31 and covers the light source 2. In this embodiment, the light source 2 is a light-emitting diode. In certain embodiments, the light source 2 may be an array of light-emitting diodes.

An axis (Q) that passes through the light source 2 is used as a reference line and is defined to be 0 degrees. Most of the light rays emitted by the light source 2 propagate within an angle ($\alpha$) that ranges between 0 degrees and 60 degrees. The light rays within the angle (α) enter the curved sections 113 of the light-incident surface 112 and project out of the light-projecting surface 111 at an angle greater than the angle (α), thereby providing a wider range of light distribution.

Figure 14:
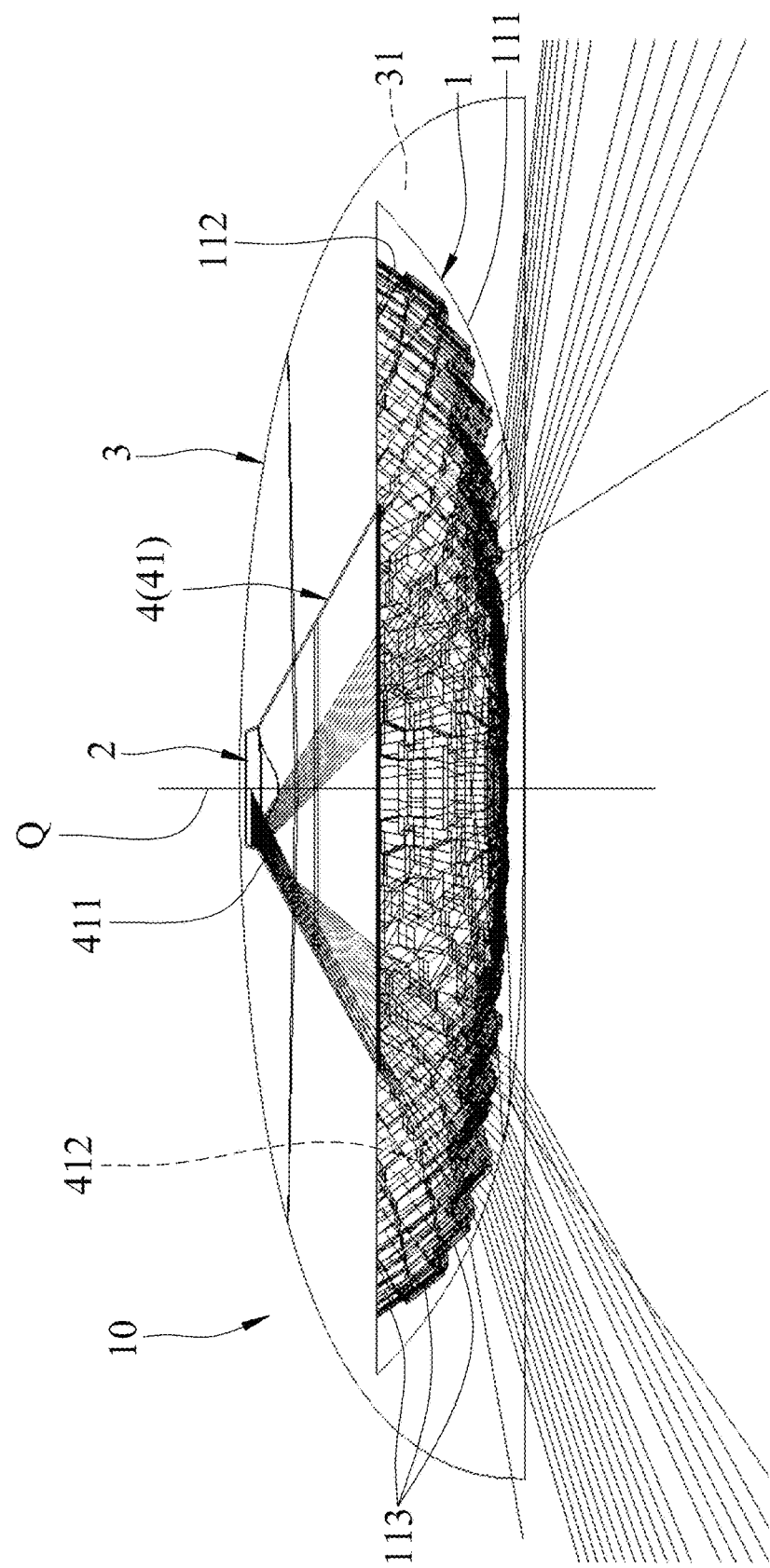
FIG. 14 is a schematic side view of a second embodiment of the optical unit according to the disclosure, with some of the light rays omitted.

Referring to FIG. 14, a second embodiment of the optical unit 10 according to the disclosure is similar to the first embodiment, with the difference residing in that the optical unit 10 of the second embodiment further includes a reflector 4 that is frusto-conical in shape, that is disposed between the housing 3 and the lens 1, and that surrounds the light source 2 so as to reflect light emitted by the light source 2 toward the light-incident surface 112.

More specifically, the reflector 4 includes a body 41 that surrounds the light source 2, and that has a first open end 411 and a second open end 412. The first open end 411 is connected to the housing 3 and is distal from the light-incident surface 112. The second open end 412 is opposite to the first open end 411 and is proximate to the light-incident surface 112. The body 41 of the reflector 4 diverges from the first open end 411 toward the second open end 412.

In this embodiment, the reflector 4 and the housing 3 are formed individually. The reflector 4 is made of aluminum and is manufactured using a spinning technique. In certain embodiments, the reflector 4 and the housing 3 may be integrally formed.

By virtue of the reflector 4, part of the light rays which propagate at an angle between 60 degrees and 90 degrees are reflected within the body 41 of the reflector 4, enter the curved sections 113 of the light-incident surface 112, and then project out of the light-projecting surface 111 at a relatively wide angle. In this way, the light rays projected out of the optical unit 10 at the angle ranging between 60 degrees and 90 degrees are effectively eliminated, so that the optical unit 10 has a relatively narrow beam spread, and provides a more focused yet uniform light distribution suitable for roadway illumination.

Figure 15:
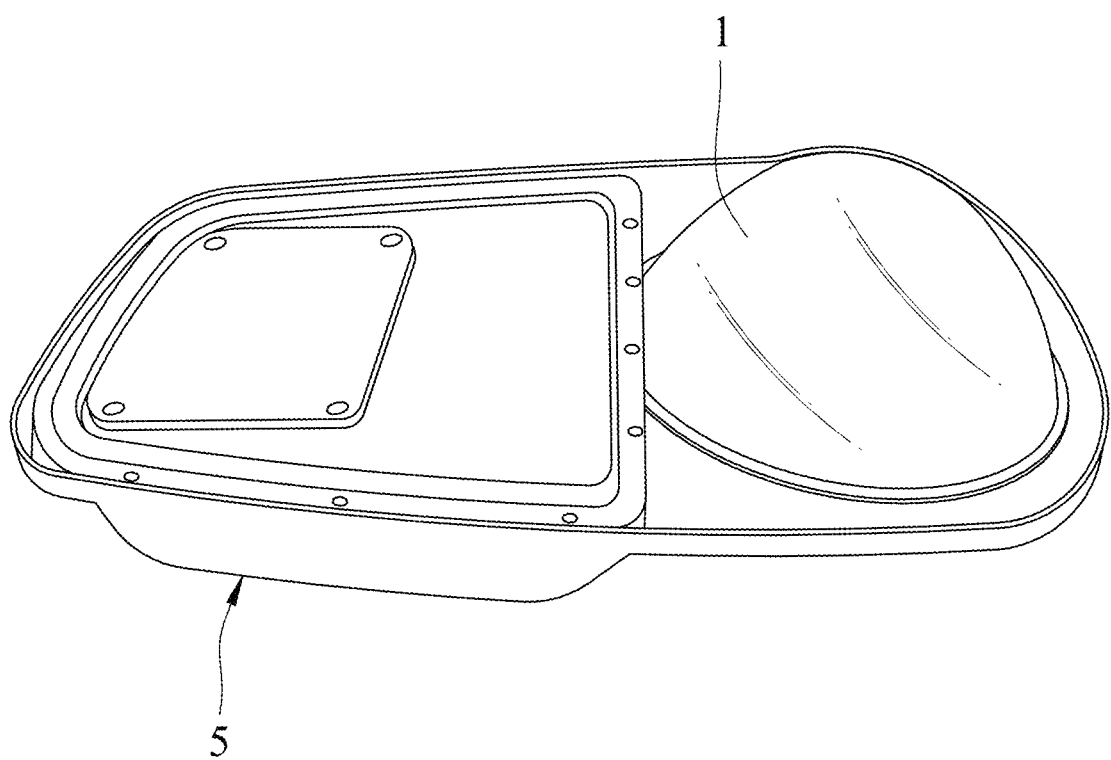
FIG. 15 is a perspective view illustrating the lens of the second embodiment mounted on a street lamp.

FIG. 15 illustrates that the lens 1 of the second embodiment is mounted on a street lamp 5.

In summary, by virtue of the configuration of the curved sections 113 of the light-incident surface 112, the thickness and the weight of the lens 1 can be reduced. Furthermore, the space available within the lens 1 is increased, thereby increasing flexibility in arrangement and configuration of the light source 2 disposed within the lens 1. The optical unit 10 including the lens 1 is capable of forming a desirable light distribution pattern when used in a street lamp.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lens adapted to control distribution of light emitted by a light source, said lens comprising:
    a main body including
        a curved light-projecting surface that is distal from the light source, and
        a light-incident surface that is opposite to said light-projecting surface, that is proximate to the light source, and that includes a plurality of curved sections facing the light source, and a plurality of connecting sections, each of said connecting sections interconnecting two adjacent ones of said curved sections, and having opposite first and second connection sides that are respectively connected to said two adjacent ones of said curved sections,
    wherein a distance between said first connection side and the light source is not equal to a distance between said second connection side and the light source.

2. The lens of claim 1, wherein each of said curved sections of said light-incident surface has a plurality of edges.

3. The lens of claim 2, wherein each of said curved sections has four edges.

4. The lens of claim 1, wherein a distance between said light-projecting surface and a center of each of said curved sections is defined as a first distance, a distance between said center of each of said curved sections and the light source being defined as a second distance, ratio of the second distance to the first distance being greater than or equal to 1.

5. The lens of claim 1, wherein said light-projecting surface is convex in shape, each of said curved sections of said light-incident surface being concave toward said light-projecting surface.

6. The lens of claim 5, wherein said curved sections increase in area toward a bottom periphery of said main body of said lens.

7. The lens of claim 6, wherein said curved sections increase in inclination toward said bottom periphery of said main body of said lens.

8. An optical unit comprising:
    a housing defining an accommodating space;
    a light source disposed in said accommodating space; and
    a lens as claimed in claim 1.

9. The optical unit of claim 8, further comprising a reflector that is disposed between said housing and said lens, and that surrounds said light source so as to reflect light emitted by said light source toward said light-incident surface of said lens.

10. The optical unit of claim 9, wherein said reflector includes a body that surrounds said light source and that has a first open end connected to said housing and distal from said light-incident surface, and a second open end opposite to said first open end and proximate to said light-incident surface, said body of said reflector diverging from said first open end toward said second open end.

11. The optical unit of claim 9, wherein said reflector and said housing are integrally formed.

12. The optical unit of claim 8, wherein said light source is a light-emitting diode.

13. The optical unit of claim 8, wherein said light source is an array of light-emitting diodes.

* * * * *